(12) United States Patent
Chen et al.

(10) Patent No.: US 12,086,206 B2
(45) Date of Patent: Sep. 10, 2024

(54) MATRIX MULTIPLIER AND OPERATION METHOD THEREOF

(71) Applicant: NEUCHIPS CORPORATION, Hsinchu (TW)

(72) Inventors: Jian-Wen Chen, Kaohsiung (TW); YuShan Ruan, New Taipei (TW); Chih-Wei Chang, Hsinchu (TW); Youn-Long Lin, Hsinchu County (TW)

(73) Assignee: NEUCHIPS CORPORATION, Hsinchu (TW)

( * ) Notice: Subject to any disclaimer, the term of this patent is extended or adjusted under 35 U.S.C. 154(b) by 511 days.

(21) Appl. No.: 17/391,045

(22) Filed: Aug. 2, 2021

(65) Prior Publication Data

US 2022/0358183 A1 Nov. 10, 2022

(30) Foreign Application Priority Data

May 5, 2021 (TW) ................... 110116144

(51) Int. Cl.
*G06F 17/16* (2006.01)
*G06F 7/50* (2006.01)
*G06F 7/523* (2006.01)
*G06F 7/544* (2006.01)
*G06N 3/063* (2023.01)

(52) U.S. Cl.
CPC ............... *G06F 17/16* (2013.01); *G06F 7/50* (2013.01); *G06F 7/523* (2013.01); *G06F 7/5443* (2013.01); *G06N 3/063* (2013.01)

(58) Field of Classification Search
CPC ........... G06N 3/063; G06F 17/16; G06F 7/50; G06F 7/523; G06F 7/5443
See application file for complete search history.

(56) References Cited

U.S. PATENT DOCUMENTS

| 10,853,035 | B2 | 12/2020 | Fais et al. |
| 2019/0042542 | A1 | 2/2019 | Narayanamoorthy et al. |
| 2019/0272183 | A1 | 9/2019 | Bajic et al. |

(Continued)

FOREIGN PATENT DOCUMENTS

| CN | 111667064 | 9/2020 |
| TW | 201824094 | 7/2018 |

(Continued)

OTHER PUBLICATIONS

"Office Action of Taiwan Counterpart Application", issued on Nov. 8, 2022, p. 1-p. 15.

*Primary Examiner* — Tan V Mai
(74) *Attorney, Agent, or Firm* — JCIPRNET

(57) ABSTRACT

A matrix multiplier and an operation method thereof are provided. The matrix multiplier includes a plurality of first input lines, a plurality of second input lines and a computing array. The computing array includes a plurality of multiplication accumulation (MAC) cells. A first MAC cell of the plurality of MAC cells is coupled to a first corresponding input line of the plurality of first input lines and a second corresponding input line of the plurality of second input lines to receive a first input value and a second input value to perform a multiplication accumulation operation. When at least one of the first input value and the second input value is a specified value, the multiplication accumulation operation of the first MAC cell is disabled.

20 Claims, 6 Drawing Sheets

(56) References Cited

U.S. PATENT DOCUMENTS

2020/0409705 A1   12/2020  Ould-Ahmed-Vall et al.
2021/0011971 A1*   1/2021  Lai ......................... G06F 17/16

FOREIGN PATENT DOCUMENTS

TW      I636368      9/2018
TW      I684141      2/2020
TW      I688871      3/2020
TW      I770261      7/2022

* cited by examiner

MATRIX MULTIPLIER AND OPERATION METHOD THEREOF

CROSS-REFERENCE TO RELATED APPLICATION

This application claims the priority benefit of Taiwan application serial no. 110116144, filed on May 5, 2021. The entirety of the above-mentioned patent application is hereby incorporated by reference herein and made a part of this specification.

BACKGROUND

Technical Field

The disclosure relates to a multiplier, and particularly relates to a matrix multiplier and an operation method thereof.

Description of Related Art

In artificial intelligence (AI), a neural network with a multilayer perceptron structure is often used, where each layer of perceptron may perform a matrix multiplication calculation, and then a result of the matrix multiplication is converted through an activation function to serve as an input matrix of a next layer of perceptron. On the one hand, with the extensive use of a rectified linear unit (ReLU) as the activation function in existing applications, negative values generated through the matrix multiplication are converted to zero by the ReLU. On the other hand, as pruning technology is also widely used in neural networks, a large number of values in the matrix are pruned to zero. As a result, the existing artificial intelligence and neural network operations include a large number of zero-value matrix multiplication operations.

SUMMARY

The invention is directed to a matrix multiplier and an operation method thereof, which are adapted to save power consumption when performing matrix multiplication.

In an embodiment of the invention, the matrix multiplier includes a plurality of first input lines, a plurality of second input lines and a computing array. The computing array includes a plurality of multiplication accumulation (MAC) cells. A first MAC cell of the plurality of MAC cells is coupled to a first corresponding input line of the plurality of first input lines and a second corresponding input line of the plurality of second input lines to receive a first input value and a second input value to perform a multiplication accumulation operation. When at least one of the first input value and the second input value is a specified value, the multiplication accumulation operation of the first MAC cell is disabled.

In an embodiment of the invention, the operation method includes following steps. A first MAC cell of a plurality of MAC cells respectively receives a first input value and a second input value from a first corresponding input line of a plurality of first input lines and a second corresponding input line of a plurality of second input lines to perform a multiplication accumulation operation. When at least one of the first input value and the second input value is a specified value, the multiplication accumulation operation of the first MAC cell is disabled.

Based on the above description, the matrix multiplier and the operation method thereof of the invention may disable the multiplication accumulation operations performed by a corresponding column or a corresponding row in the computing array based on the first input value and the second input value, thus effectively reducing the power consumption consumed during matrix multiplication.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
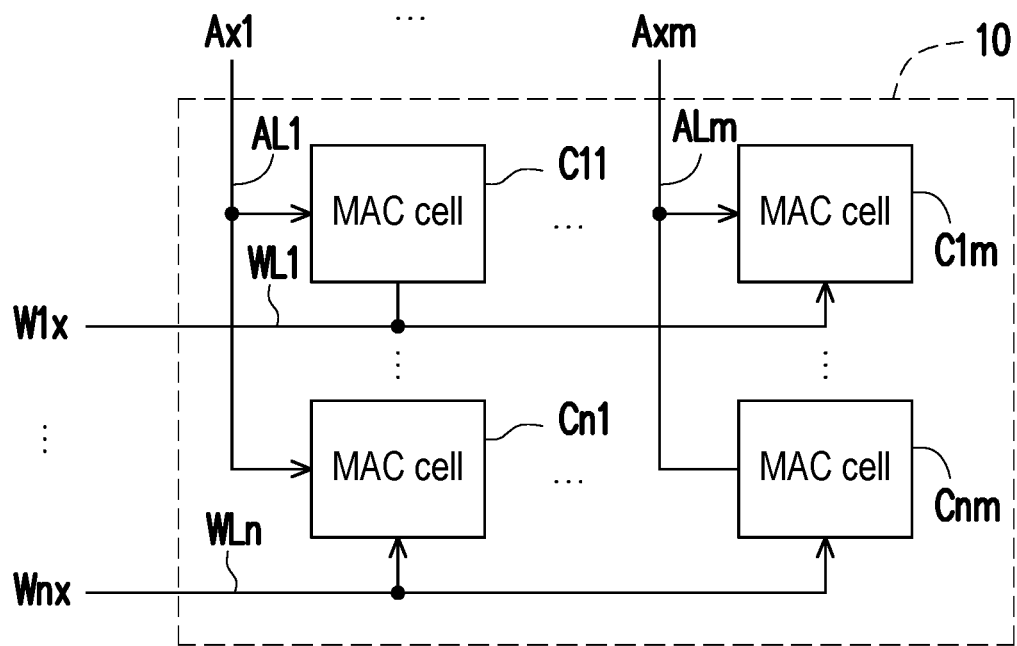
FIG. 1 is a schematic circuit block diagram of a matrix multiplier according to an embodiment of the invention.

FIG. 1 is a schematic circuit block diagram of a matrix multiplier 1 according to an embodiment of the invention. The matrix multiplier 1 shown in FIG. 1 includes first input lines WL1-WLn, second input lines AL1-ALm, and a computing array 10. The computing array 10 may respectively receive first input values $W1x$-$Wnx$ from the first input lines WL1-WLn, and respectively receive second input values $Ax1$-$Axm$ from the second input lines AL1-ALm. The computing array 10 may perform a matrix multiplication operation based on the first input values $W1x$-$Wnx$ and the second input values $Ax1$-$Axm$.

In detail, the computing array 10 includes n*m multiplication accumulation (MAC) cells C11, ..., C1m, ..., Cn1, ..., Cnm, where m and n are integers determined according to an actual design. Each MAC cell is coupled to a first corresponding input line of the first input lines WL1-WLn and a second corresponding input line of the second input lines AL1-ALm. In this way, the MAC cell may receive a corresponding first input value and a corresponding second input value to perform a multiplication accumulation operation. For example, the MAC cell C11 is coupled to the first corresponding input line WL1 and the second corresponding input line AU to receive the first input value W1x and the second input value Ax1 to perform the multiplication accumulation operation.

Figure 2:
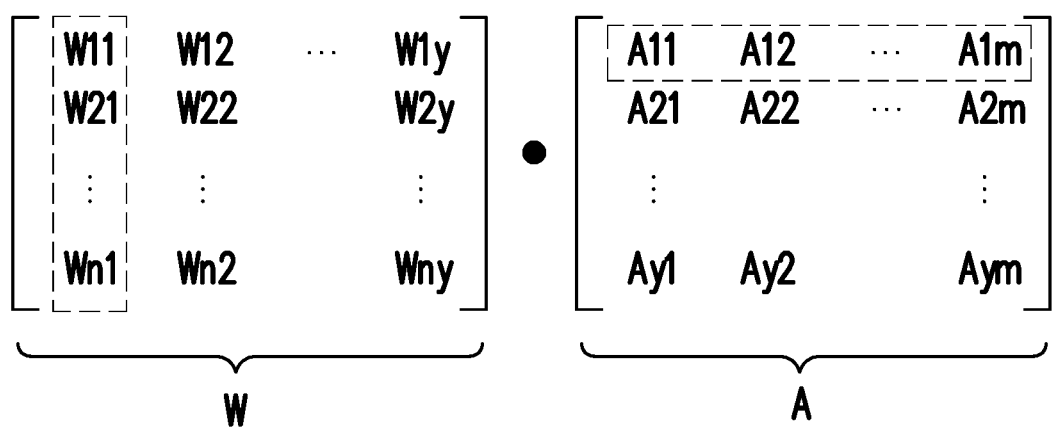
FIG. 2 is a schematic diagram of a specific example of a matrix multiplication operation performed by the matrix multiplier shown in FIG. 1.

FIG. 2 is a schematic diagram of a specific example of the matrix multiplication operation performed by the matrix multiplier 1 shown in FIG. 1. Referring to FIG. 1 and FIG. 2 to learn an operation description of the matrix multiplier 1 below. In detail, the matrix multiplier 1 may be used to calculate a multiplication operation of two matrices W and A, where the matrix W may have n rows and y columns, and the matrix A may have y rows and m columns. First, a plurality of first input values W11-Wn1 of a first column of the matrix W may be respectively provided to the first input lines WL1-WLn of the matrix multiplier 1 (to serve as the first input values W1x-Wnx shown in FIG. 1), and a plurality of second input values A11-A1m of a first row of the matrix A may be respectively provided to the second input lines AL1-ALm of the matrix multiplier 1 (to serve as the second input values Ax1-Axm shown in FIG. 1), so that each of the MAC cells C11-Cnm may calculate a product of a corresponding one of the first input values W11-Wn1 and a corresponding one of the second input values A11-A1m, and accumulate the product as a product accumulation value. By now, the matrix multiplier 1 has completed the multiplication accumulation operation on the first column of the matrix W and the first row of the matrix A.

After the matrix multiplier 1 has completed the multiplication accumulation operation of the first column of the matrix W and the first row of the matrix A, the multiplication accumulation operation may be performed on a second column of the matrix W and a second row of the matrix A. A plurality of first input values W12-Wn2 of the second column of the matrix W are respectively provided to the first input lines WL1-WLn (to serve as the first input values W1x-Wnx shown in FIG. 1), and a plurality of second input values A21-A2m of the second row of the matrix A are respectively provided to the second input lines AL1-ALm (to serve as the second input values Ax1-Axm shown in FIG. 1). In this way, each of the MAC cells C11-Cnm may calculate a product of a corresponding one of the first input values W12-Wn2 and a corresponding one of the second input values A21-A2m, and accumulate the calculated product to the product accumulation value.

Deduced by analogy, each column of the matrix W and each row of the matrix A may be sequentially provided to the matrix multiplier 1 to perform the multiplication accumulation operation. After the matrix multiplier 1 has completed the multiplication accumulation operations of all columns of the matrix W and all rows of the matrix A, the matrix multiplier 1 completes the matrix multiplication operation of the matrix W and the matrix A. The matrix multiplier 1 may output the product accumulation values stored in all of the MAC cells C11-Cnm, which is a matrix multiplication result of the matrix W and the matrix A.

For example, take the MAC cell C11 as an example. First, during a first operation period, the MAC cell C11 may first receive the first input value W11 from the first input line WL1 and receive the second input value A11 from the second input line AL1. The MAC cell C11 may calculate a product of the first input value W11 and the second input value A11, and store the product of the two input values as a product accumulation value. Then, during a second operation period after the first operation period, the MAC cell C11 may further receive the first input value W12 from the first input line WL1 and receive the second input value A21 from the second input line AL1, and calculate a product of the first input value W12 and the second input value A21. Further, the MAC cell C11 may accumulate the product of the first input value W12 and the second input value A21 to the stored product accumulation value (i.e., the product of the first input value W11 and the second input value A11), and update the product accumulation value based on the result of the above accumulation. By now, the product accumulation value of the MAC cell C11 is "W11*A11+W12*A21". Deduced by analogy, as all columns of the matrix W and all rows of the matrix A are provided to the matrix multiplier 1 (after a y-th operation period is ended), the MAC cell C11 may calculate the product accumulation value of the first input values W11-W1y with the second input values A11-Ay1, which is "W11*A11+W12*A21+ . . . +W1y*Ay1".

It should be noted that in some applications, the elements of the matrix W and/or the matrix A may be a predetermined value (for example, "0" or other values). For example, the multilayer perception in the neural network is generally used to perform a matrix multiplication operation on a weight matrix and an activation matrix, and then the matrix multiplication result is introduced to an activation function (such as the ReLU) to form a new activation matrix. The ReLU (or other activation function) will make negative numbers to become zero, so that about a half of element values in the new activation matrix may be zero. Moreover, as a pruning technique is widely used in neural network models, the pruning technique also results in a fact that a large amount of values in the weight matrix is pruned to zero. Therefore, when a certain element of the matrix W and/or the matrix A has a value of "0", the multiplication accumulation operation performed by the computing array 10 on such element value "0" is redundant. The multiplication accumulation operation performed with the element value "0" is redundant, which also consumes power. As a size of the matrix increases, the power consumption of the computing array 10 also increases.

Figure 3:
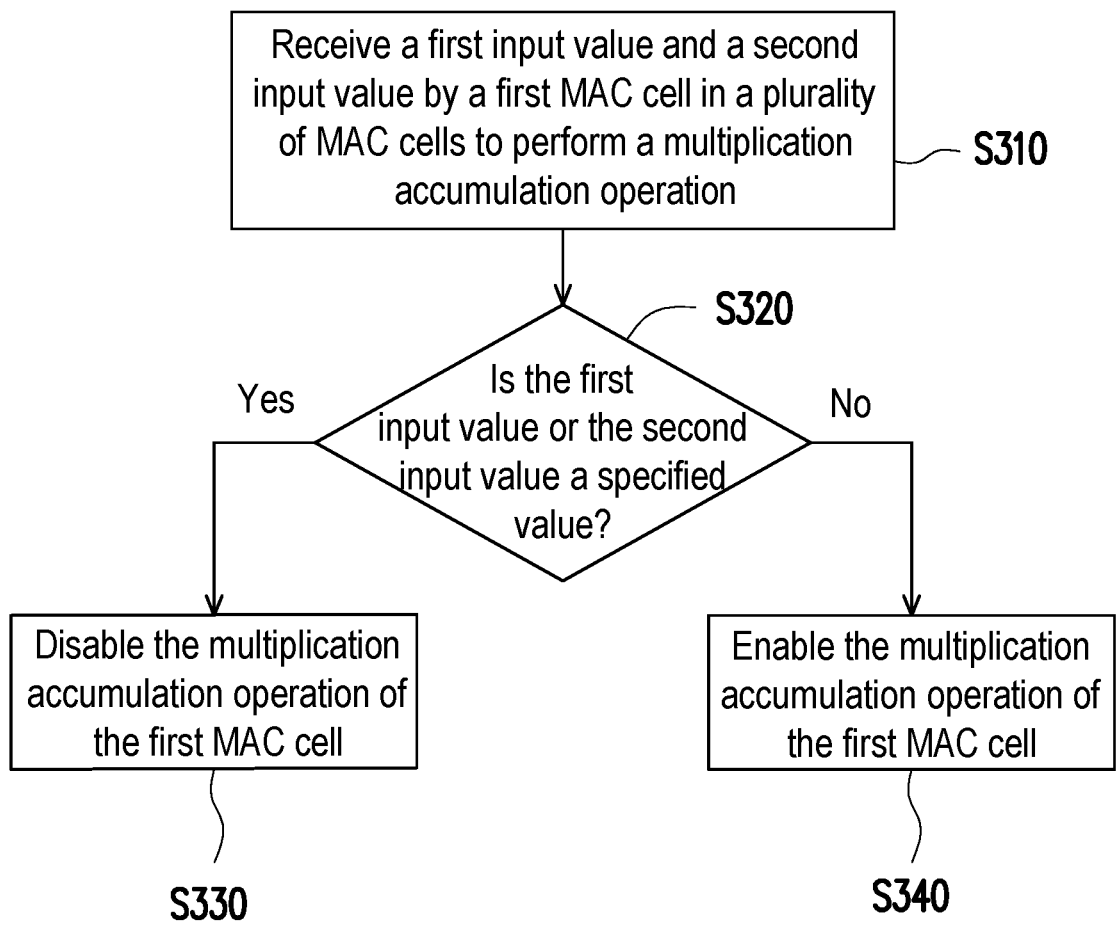
FIG. 3 is a schematic flowchart of an operation method of a matrix multiplier according to an embodiment of the invention.

FIG. 3 is a schematic flowchart of an operation method of a matrix multiplier according to an embodiment of the invention. In step S310, an MAC cell in the computing array 10 respectively receives a first input value and a second input value from a first corresponding input line of the first input lines WL1-WLn and a second corresponding input line of the second input lines AL1-ALm to perform a multiplication accumulation operation. Taking the MAC cell C11 as an example, the MAC cell C11 may respectively receive the first input value W1x and the second input value Ax1 from the first corresponding first input line WL1 and the second corresponding input line AL1 to perform the multiplication accumulation operation. In step S320, it is determined whether the first input value W1x or the second input value Ax1 is a specified value. In some embodiments, step S320 may be executed by the MAC cell C11. In other embodiments, step S320 may be executed by a front-end circuit of the MAC cell C11 (for example, row input circuits 43-1 to 43-n and column input circuits 44-1 to 44-m shown in FIG. 5).

When at least one of the first input value and the second input value is the specified value (a determination result of step S320 is "Yes"), the multiplication accumulation operation performed by the MAC cell is disabled (step S330). When the first input value and the second input value are all not the specified value (the determination result of step S320 is "No"), the multiplication accumulation operation performed by the MAC cell may be enabled (step S340). The MAC cells C11-Cnm may disable the execution of the multiplication accumulation operation when at least one of the received first value and the second input value is the specified value. Each of the MAC cells C11-Cnm may be disabled (or enabled) independently. Taking the MAC cell C11 as an example, when at least one of the first input value W1x and the second input value Ax1 is "0" (the specified value), step S330 may disable the multiplication accumulation operation performed by the MAC cell C11 to save power consumption. When the first input value W1x and the second input value Ax1 are not "0" (the specified value), step S340 may enable the multiplication accumulation operation performed by the MAC cell C11. Operations of the other MAC cells of the computing array 10 may be deduced by referring to the related description of the MAC cell C11, and details thereof are not repeated. In this way, in view of the whole computing array 10, when one of the first input values W1x-Wnx is "0" (the specified value), the multiplication accumulation operations of the entire row of the MAC cells corresponding to the first input value "0" in the computing array 10 may be disabled to save power consumption. Similarly, when one of the second input values Ax1-Axm is "0" (the specified value), the multiplication accumulation operations of the entire column of the MAC cells corresponding to the second input value "0" in the computing array 10 may be disabled to save power consumption.

Figure 4:
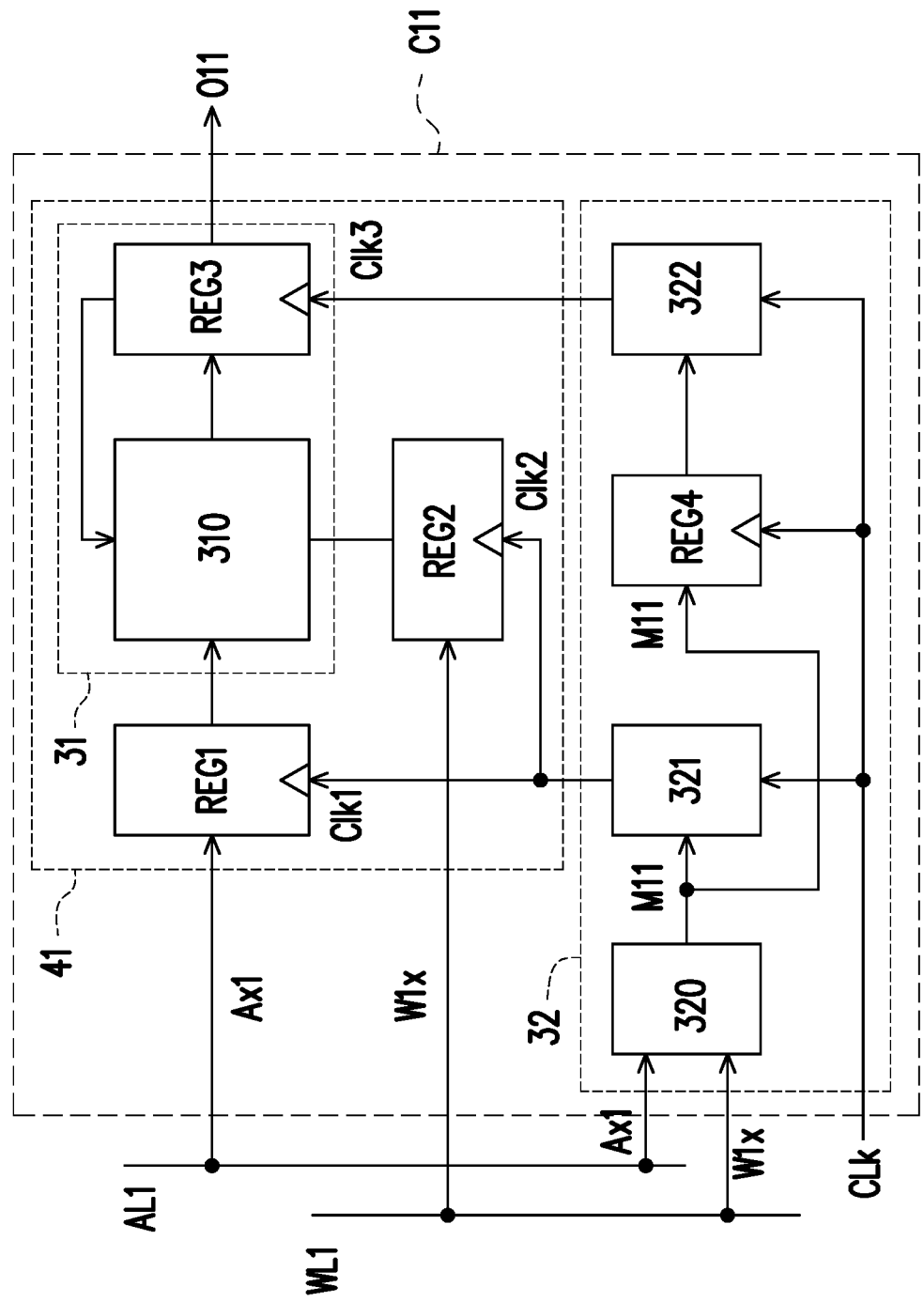
FIG. 4 is a schematic circuit block diagram of a MAC cell shown in FIG. 1 according to an embodiment of the invention.

FIG. 4 is a schematic circuit block diagram of the MAC cell C11 shown in FIG. 1 according to an embodiment of the invention. Referring to FIG. 1 and FIG. 4 together to learn the following description of the MAC cell C11. The other MAC cells of the computing array 10 shown in FIG. 1 may be deduced by analogy with reference to the related description of the MAC cell C11 shown in FIG. 4, so that details thereof are not repeated.

The MAC cell C11 shown in FIG. 4 includes a multiplication accumulation operation circuit 41 and a control circuit 32. The multiplication accumulation operation circuit 41 is coupled to the first corresponding input line WL1 and the second corresponding input line AL1 to receive the first input value W1x and the second input value Ax1 to perform the multiplication accumulation operation. "O11" shown in FIG. 4 represents an operation result of the multiplication accumulation operation of the MAC cell C11 (a product accumulation value). The control circuit 32 controls the multiplication accumulation operation circuit 41. When at least one of the first input value W1x and the second input value Ax1 is "0" (the specified value), the control circuit 32 may disable the multiplication accumulation operation of the multiplication accumulation operation circuit 41 to save power consumption. When the first input value W1x and the second input value Ax1 are all not "0" (the specified value), the control circuit 32 may enable the multiplication accumulation operation of the multiplication accumulation operation circuit 41.

In the embodiment shown in FIG. 4, the multiplication accumulation operation circuit 41 includes a register REG1, a register REG2, and a multiplication accumulation circuit 31. An input terminal of the register REG2 is coupled to the first corresponding input line WL1 to receive the first input value W1x. The register REG2 latches the first input value W1x according to a clock signal Clk2. An input terminal of the register REG1 is coupled to the second corresponding input line AL1 to receive the second input value Ax1. The register REG1 latches the second input value Ax1 according to a clock signal Clk1. The multiplication accumulation circuit 31 is coupled to an output terminal of the register REG1 and an output terminal of the register REG2. The multiplication accumulation circuit 31 may perform a multiplication accumulation operation on an output of the register REG1 and an output of the register REG2 according to a clock signal Clk3 to output the product accumulation value O11. When at least one of the first input value W1x and the second input value Ax1 is "0" (the specified value), the control circuit 32 may shield (not provide) at least one of the clock signal Clk1, the clock signal Clk2, and the clock signal Clk3 to disable the multiplication accumulation operation of the multiplication accumulation circuit 31.

In the embodiment of FIG. 4, the multiplication accumulation circuit 31 includes a multiplier-accumulator 310 and a register REG3. The register REG3 may store the product accumulation value O11. The multiplier-accumulator 310 is coupled to the register REG1, the register REG2, and the register REG3. The multiplier-accumulator 310 may calculate a product of the output of the register REG1 and the output of the register REG2 (for example, W1x*Ax1). The multiplier-accumulator 310 may calculate a sum of the product and the product accumulation value O11 (for example, W1x*Ax1+O11). The multiplier-accumulator may provide the sum to the register REG3 to update the product accumulation value O11. The register REG3 may update and accumulate the product accumulation value O11 according to the clock signal Clk3. The control circuit 32 may receive the clock signal C1k to generate suitable clock signals Clk1, Clk2, and Clk3 to trigger terminals of the registers REG1, REG2, and REG3. When the first input value W1x and (or) the second input value Ax1 are specified values, the control circuit 32 may shield (not provide) the clock signals Clk1, Clk2, and Clk3, thereby disabling the multiplication accumulation operation performed by the MAC cell C11 to avoid extra power consumption.

To be specific, when the first input value W1x or the second input value Ax1 is the specified value, the clock signals Clk1-Clk3 are shielded to disable the multiplication accumulation operation of the MAC cell C11. Since the registers REG1-REG3 in the MAC cell C11 are not triggered, there will be no signal transmission and toggle in the registers REG1-REG3 and the multiplier-accumulator 310 (the multiplication accumulation operation is not performed), and the power consumption of the multiplication accumulation operation circuit 41 may be effectively reduced. Therefore, the MAC cell C11 may effectively save the power consumption consumed during matrix multiplication by shielding the clock signals Clk1-Clk3.

In the embodiment shown in FIG. 4, the control circuit 32 includes a computation shielding circuit 320, a gate control circuit 321, a gate control circuit 322, and a register REG4. An output terminal of the computation shielding circuit 320 is coupled to a control terminal of the gate control circuit 321 and an input terminal of the register REG4. An output terminal of the register REG4 is coupled to a control terminal of the gate control circuit 322. The computation shielding circuit 320 may respectively receive the first input value W1x and the second input value Ax1 through two input terminals to determine whether any one of the first input value W1x and the second input value Ax1 is the specified value (for example, 0), and generate a computation shielding signal M11. The computation shielding circuit 320 may provide the computation shielding signal M11 to the gate control circuit 321 and the register REG4, and the register REG4 may provide the computation shielding signal M11 to the gate control circuit 322. When the first input value W1x is "0" and/or the second input value Ax1 is "0", the computation shielding signal M11 may be a first logic level (for example, a low level). When the first input value W1x is not "0" and the second input value Ax1 is not "0", the computation shielding signal M11 may be a second logic level (for example, a high level).

The control terminal of the gate control circuit 321 is coupled to the output terminal of the computation shielding circuit 320 to receive the computation shielding signal M11. An output terminal of the gate control circuit 321 is coupled to the trigger terminal of the register REG1 and the trigger terminal of the register REG2 to control the multiplication accumulation operation of the multiplication accumulation operation circuit 41. The gate control circuit 321 may receive the clock signal C1k to generate the clock signals Clk1 and Clk2. For example, the gate control circuit 321 may determine whether to provide the clock signal Clk1 and the clock signal Clk2 to the trigger terminal of the register REG1 and the trigger terminal of the register REG2 according to the computation shielding signal M11.

An input terminal of the register REG4 is coupled to the output terminal of the computation shielding circuit 320 to receive the computation shielding signal M11. The control terminal of the gate control circuit 322 is coupled to the output terminal of the register REG4. The output terminal of the gate control circuit 322 is coupled to the trigger terminal of the register REG3. The gate control circuit 322 may receive the clock signal C1k to generate the clock signal Clk3 to the trigger terminal of the register REG3. The gate control circuit 322 may determine whether to provide the clock signal Clk3 to the trigger terminal of the register REG3 according to the output of the register REG4 (the computation shielding signal M11).

Figure 5:
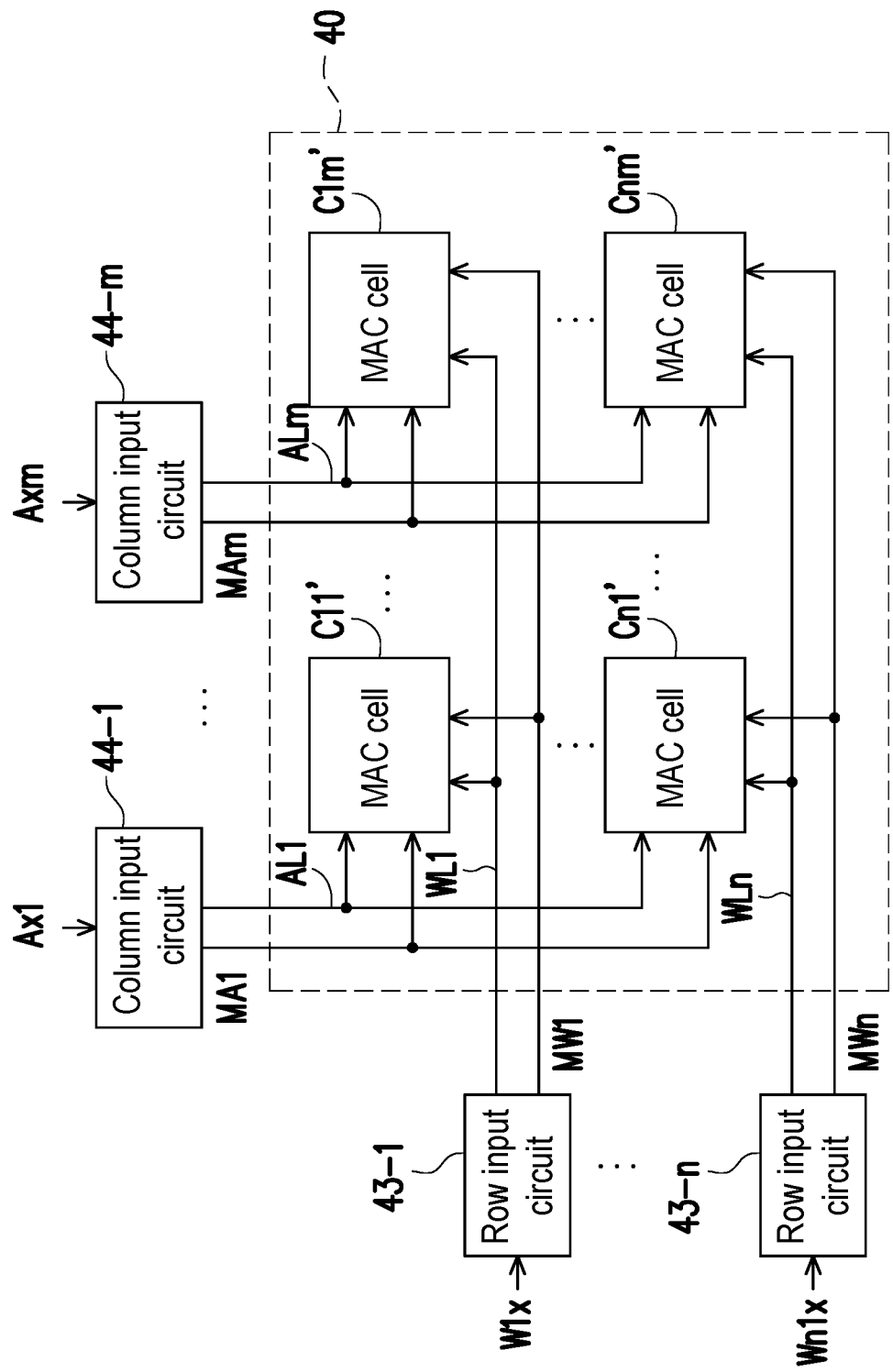
FIG. 5 is a schematic circuit block diagram of a matrix multiplier according to another embodiment of the invention.

FIG. 5 is a schematic circuit block diagram of a matrix multiplier 4 according to another embodiment of the invention. The matrix multiplier 4 shown in FIG. 5 includes row input circuits 43-1 to 43-n, column input circuits 44-1 to 44-m, first input lines WL1-WLn, second input lines AL1-ALm, and a computing array 40. The row input circuits 43-1 to 43-n may respectively receive the first input values W1x-Wnx, and provide the first input values W1x-Wnx and row shielding signals MW1-MWn to the computing array 40. The column input circuits 44-1 to 44-m may respectively receive the second input values Ax1-Axm, and provide the second input values Ax1-Axm and column shielding signals MA1-MAm to the computing array 40.

The computing array 40 includes n*m MAC cells C11', . . . , C1m', . . . , Cn1', . . . , Cnm', where m and n are integers determined according to an actual design. The computing array 40 may perform multiplication accumulation operations according to the first input values W1x-Wnx and the second input values Ax1-Axm. Operations of the matrix multiplier 4, the first input lines WL1-WLn, the second input lines AL1-ALm, the computing array 40, and the MAC cells C11'-Cnm' shown in FIG. 5 may be deduced by referring to related description of the matrix multiplier 1, the first input lines WL1-WLn, the second input lines AL1-ALm, the computing array 10, and the MAC cells C11-Cnm. The difference from the embodiment shown in FIG. 1 is that the computing array 40 shown in FIG. 5 may determine whether to disable the multiplication accumulation operations of the MAC cells of the corresponding columns in the computing array 40 according to the column shielding signals MA1-MAm, and the computing array 40 may determine whether to disable the multiplication accumulation operations of the MAC cells of the corresponding rows in the computing array 40 according to the row shielding signals MW1-MWn.

To be specific, taking the row input circuit 43-1 as an example, the row input circuit 43-1 receives the first input value W1x, and the row input circuit 43-1 determines whether the first input value W1x is the specified value (for example, 0) to generate the row shielding signal MW1, and the row input circuit 43-1 provides the row shielding signal MW1 to the MAC cells C11'-C1m' connected to the first corresponding input line WL1. When the row input circuit 43-1 determines that the first input value W1x is "0" (the specified value), the row input circuit 43-1 may shield the first input value W1x (do not provide the first input value W1x to the first input line WL1). Meanwhile, the row input circuit 43-1 may also provide the row shielding signal MW1 to the MAC cells C11'-C1m' connected to the first input line WL1 to indicate "the first input value W1x is "0" (the specified value)". When the row shielding signal MW1 indicates that the first input value W1x is "0" (the specified value), the multiplication accumulation operations of the MAC cells C11'-C1m' connected to the first corresponding input line WL1 may be selectively disabled to save power consumption. When the row input circuit 43-1 determines that the first input value W1x is not "0" (the specified value), the row input circuit 43-1 may provide the first input value W1x to the first input line WL1, and the row input circuit 43-1 may also provide the row shielding signal MW1 indicating "the first input value W1x is not "0" (the specified value)" to the MAC cells C11'-C1m' connected to the first input line WL1. The other row input circuits shown in FIG. 5 may be deduced by referring to the related description of the row input circuit 43-1, and details thereof are not repeated.

Deduced by analogy, the column input circuit 44-1 receives the second input value Ax1, the column input circuit 44-1 determines whether the second input value Ax1 is the specified value (for example, 0) to generate a column shielding signal MA1, and the column input circuit 44-1 provides the column shielding signal MA1 to the MAC cells C11'-Cn1' connected to the second corresponding input line AL1. When the column shielding signal MA1 indicates that the second input value Ax1 is "0" (the specified value), the multiplication accumulation operations of the MAC cells C11'-Cn1' connected to the second corresponding input line AL1 may be selectively disabled to save power consumption. In addition, since the second input value Ax1 is "0", the column input circuit 44-1 may shield the second input value Ax1 (not to provide the second input value Ax1 to the second input line AL1). The other column input circuits shown in FIG. 5 may be deduced by referring to the related description of the column input circuit 44-1, and details thereof are not repeated.

Figure 6:
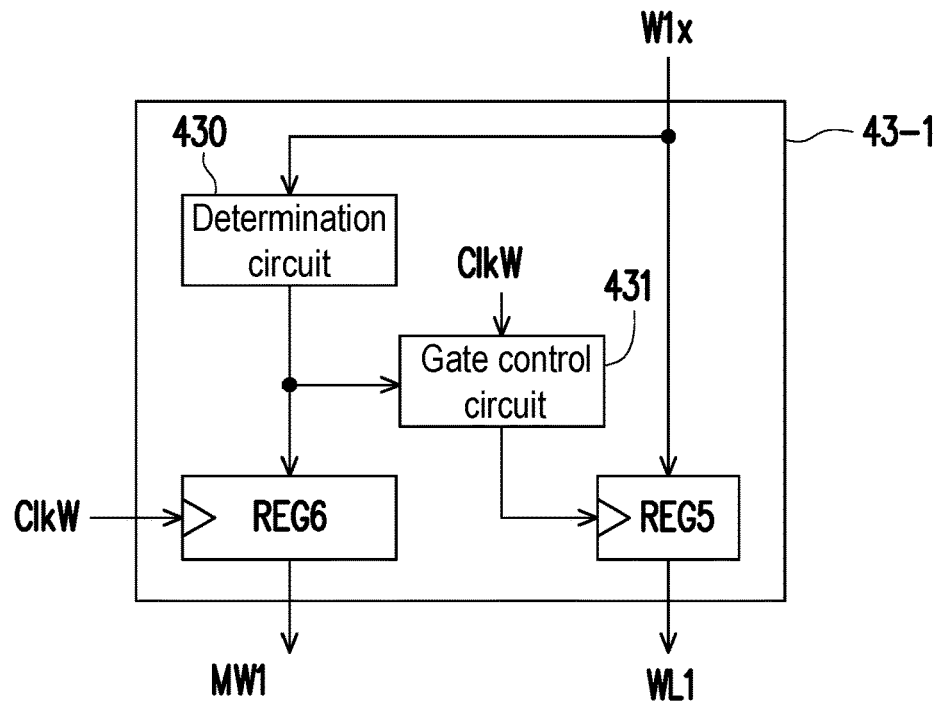
FIG. 6 is a schematic circuit block diagram of a row input circuit shown in FIG. 5 according to an embodiment of the invention.

FIG. 6 is a schematic circuit block diagram of the row input circuit 43-1 shown in FIG. 5 according to an embodiment of the invention. The other row input circuits shown in FIG. 5 may be deduced by analogy with reference to the related description of the row input circuit 43-1 shown in FIG. 6, so that details thereof are not repeated. In the embodiment shown in FIG. 6, the row input circuit 43-1 includes a determination circuit 430, a gate control circuit 431, an input value register REG5, and a register REG6. An input terminal of the input value register REG5 receives the first input value W1x. A trigger terminal of the input value register REG5 is coupled to an output terminal of the gate control circuit 431. When the gate control circuit 431 is turned on, the trigger terminal of the input value register REG5 may receive a clock signal ClkW. The input value register REG5 may determine whether to latch the first input value W1x according to the signal received through the trigger terminal, so as to provide the first input value W1x to the first input line WL1.

An input terminal of the determination circuit 430 may receive the first input value W1x. The determination circuit 430 may determine whether the first input value W1x is a specified value to generate the row shielding signal MW1.

An input terminal of the register REG6 is coupled to an output terminal of the determination circuit 430 to receive the row shielding signal MW1. Based on triggering of the clock signal ClkW, the register REG6 may latch and output the row shielding signal MW1.

In an embodiment, when the specified value is zero, the determination circuit 430 may be, for example, a non-zero determination circuit. When the determination circuit 430 determines that the first input value W1x is not "0" (the specified value), the determination circuit 430 may generate the row shielding signal MW1 of a first logic level (for example, a high voltage level) to the input terminal of the register REG6 and the control terminal of the gate control circuit 431. When the determination circuit 430 determines that the first input value W1x is "0" (the specified value), the determination circuit 430 may generate the row shielding signal MW1 of a second logic level (for example, a low voltage level) to the input terminal of the register REG6 and the control terminal of the gate control circuit 431. The gate control circuit 431 may determine whether to provide the clock signal ClkW to the trigger terminal of the input value register REG5 according to the row shielding signal MW1 output by the determination circuit 430. The input value register REG5 latches and provides the first input value W1x to the first corresponding input line WL1 according to the clock signal ClkW provided by the gate control circuit 431.

In this way, when the determination circuit 430 determines that the first input value W1x is not "0" (the specified value), the row shielding signal MW1 generated by the determination circuit 430 may turn on the gate control circuit 431 to provide the clock signal ClkW to the trigger terminal of the input value register REG5, so that the input value register REG5 latches the first input value W1x and provides the first input value W1x to the first input line WL1. Conversely, when the determination circuit 430 determines that the first input value W1x is "0" (the specified value), the row shielding signal MW1 generated by the determination circuit 430 may turn off the gate control circuit 431 to shield the clock signal ClkW, such that the input value register REG5 does not latch the first input value W1x.

Figure 7:
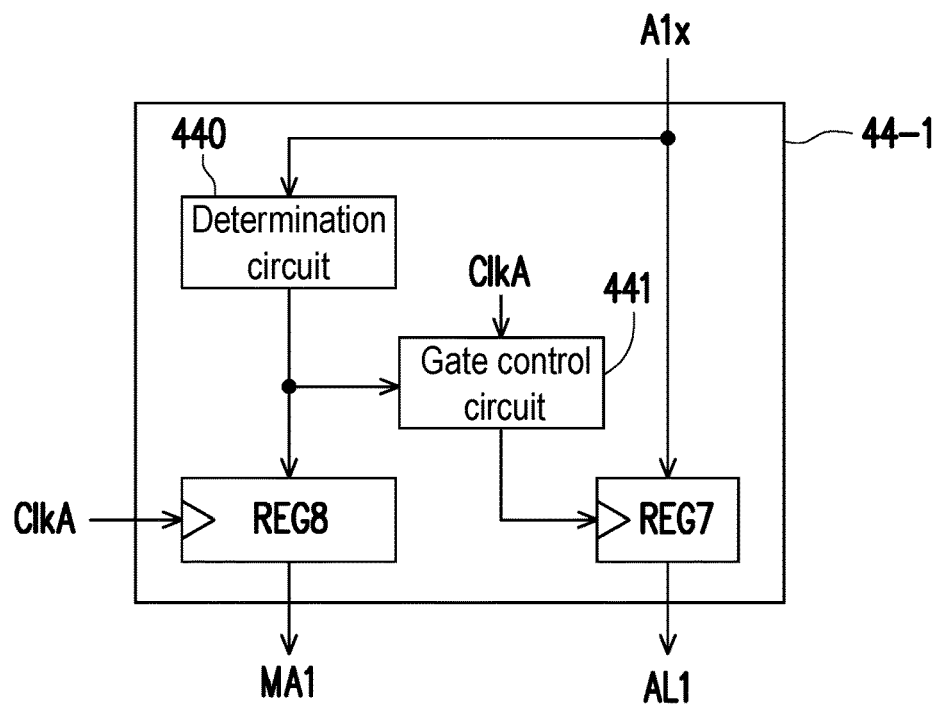
FIG. 7 is a schematic circuit block diagram of a column input circuit shown in FIG. 5 according to an embodiment of the invention.

FIG. 7 is a schematic circuit block diagram of the column input circuit 44-1 shown in FIG. 5 according to an embodiment of the invention. The other column input circuits shown in FIG. 5 may be deduced by analogy with reference to the related description of the column input circuit 44-1 shown in FIG. 7. In the embodiment shown in FIG. 7, the column input circuit 44-1 includes a determination circuit 440, a gate control circuit 441, an input value register REG7, and a register REG8. An input terminal of the input value register REG7 receives the second input value Ax1. A trigger terminal of the input value register REG7 is coupled to an output terminal of the gate control circuit 441. When the gate control circuit 441 is turned on, the trigger terminal of the input value register REG7 may receive a clock signal ClkA. The input value register REG7 may determine whether to latch the second input value Ax1 according to the signal received through the trigger terminal, so as to provide the second input value Ax1 to the second input line AL1.

An input terminal of the determination circuit 440 may receive the second input value Ax1. The determination circuit 440 may determine whether the second input value Ax1 is a specified value to generate the column shielding signal MA1. An input terminal of the register REG8 is coupled to an output terminal of the determination circuit 440 to receive the column shielding signal MA1. Based on triggering of the clock signal ClkA, the register REG8 may latch and output the column shielding signal MA1.

In an embodiment, when the specified value is zero, the determination circuit 440 may be, for example, a non-zero determination circuit. When the determination circuit 440 determines that the second input value Ax1 is not "0" (the specified value), the determination circuit 440 may generate the column shielding signal MA1 of the first logic level (for example, the high voltage level) to the input terminal of the register REG8 and the control terminal of the gate control circuit 441. When the determination circuit 440 determines that the second input value Ax1 is "0" (the specified value), the determination circuit 440 may generate the column shielding signal MA1 of the second logic level (for example, the low voltage level) to the input terminal of the register REG8 and the control terminal of the gate control circuit 441. The gate control circuit 441 may determine whether to provide the clock signal ClkA to the trigger terminal of the input value register REG7 according to the column shielding signal MA1 output by the determination circuit 440. The input value register REG7 latches and provides the second input value Ax1 to the second corresponding input line AL1 according to the clock signal ClkA provided by the gate control circuit 441.

In this way, when the determination circuit 440 determines that the second input value Ax1 is not "0" (the specified value), the column shielding signal MA1 generated by the determination circuit 440 may turn on the gate control circuit 441 to provide the clock signal ClkA to the trigger terminal of the input value register REG7, so that the input value register REG7 latches the second input value Ax1 and provides the second input value Ax1 to the second input line AL1. Conversely, when the determination circuit 440 determines that the second input value Ax1 is "0" (the specified value), the column shielding signal MA1 generated by the determination circuit 440 may turn off the gate control circuit 441 to shield the clock signal ClkA, such that the input value register REG7 does not latch the second input value Ax1.

Figure 8:
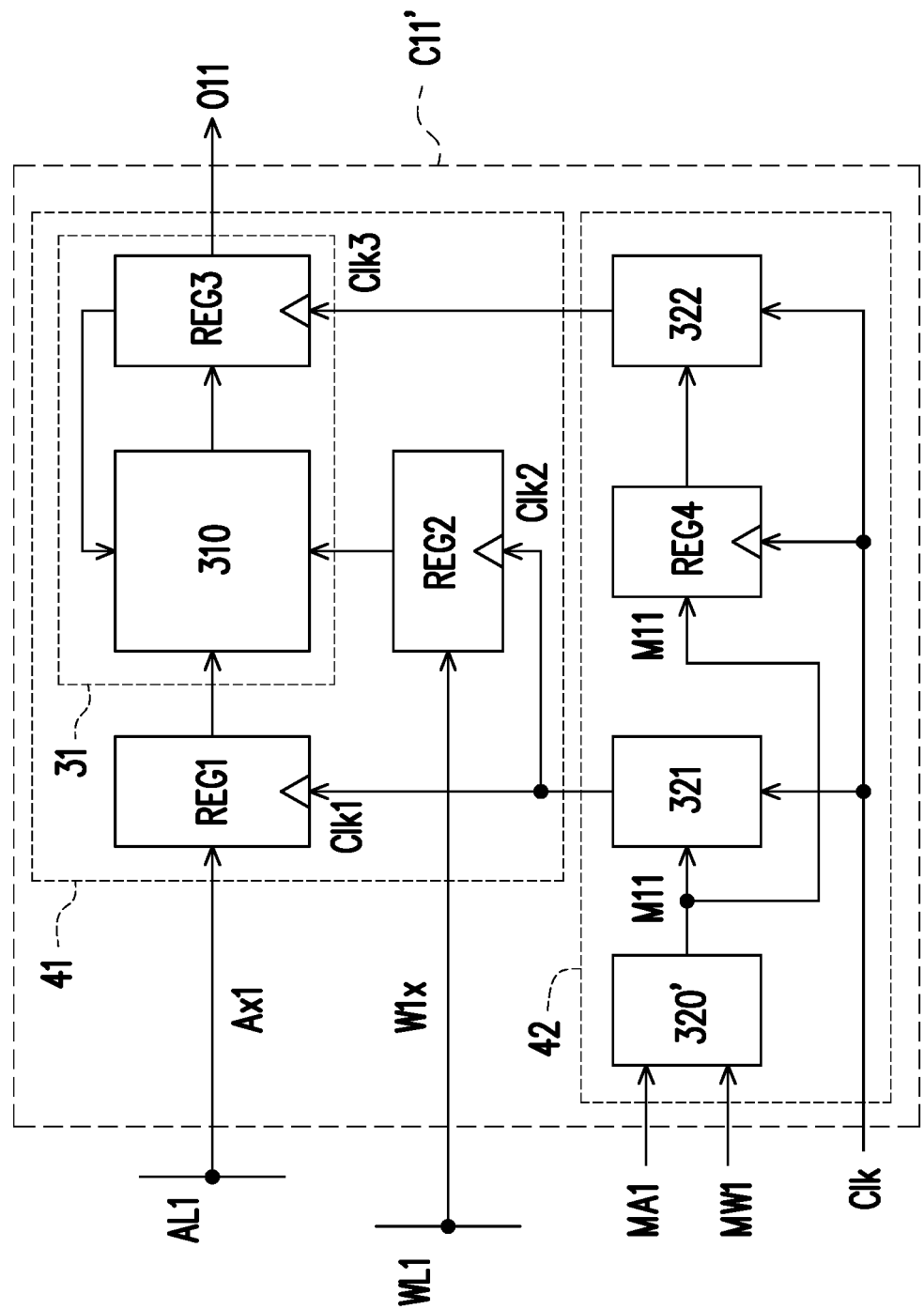
FIG. 8 is a schematic circuit block diagram of a MAC cell shown in FIG. 5 according to an embodiment of the invention.

FIG. 8 is a schematic circuit block diagram of the MAC cell C11' shown in FIG. 5 according to an embodiment of the invention. Referring to FIG. 5 and FIG. 8 together to learn the description of the MAC cell C11' of the computing array 40 below. The other MAC cells of the computing array 40 shown in FIG. 5 may be deduced by analogy with reference to the related description of the MAC cell C11' shown in FIG. 8, and details thereof are not repeated.

The MAC cell C11' shown in FIG. 8 includes a multiplication accumulation operation circuit 41 and a control circuit 42. The multiplication accumulation operation circuit 41 shown in FIG. 8 includes a register REG1, a register REG2, and a multiplication accumulation circuit 31. The multiplication accumulation circuit 31 shown in FIG. 8 includes a multiplier-accumulator 310 and a register REG3. Operations of the MAC cell C11', the multiplication accumulation operation circuit 41, the control circuit 42, the register REG1, the register REG2, the multiplication accumulation circuit 31, the multiplier-accumulator 310, and the register REG3 shown in FIG. 8 may refer to related descriptions of the MAC cell C11, the multiplication accumulation operation circuit 41, the control circuit 32, the register REG1, the register REG2, the multiplication accumulation circuit 31, the multiplier-accumulator 310, and the register REG3 shown in FIG. 4, and details thereof are not repeated.

The control circuit 42 shown in FIG. 8 includes a computation shielding circuit 320', a gate control circuit 321, a gate control circuit 322, and a register REG4. Operations of the computation shielding circuit 320', the gate control circuit 321, the gate control circuit 322 and the register REG4 shown in FIG. 8 may refer to related descriptions of the computation shielding circuit 320, the gate control circuit 321, the gate control circuit 322 and the register REG4 shown in FIG. 4, and details thereof are not repeated. A difference between the MAC cell C11' shown in FIG. 8 and the MAC cell C11 shown in FIG. 4 is that the two input terminals of the computation shielding circuit 320 in the MAC cell C11 shown in FIG. 4 respectively receive the first input value W1x and the second input value Ax1, but two input terminals of the computation shielding circuit 320' in the MAC cell C11' shown in FIG. 8 respectively receive the column shielding signal MA1 and the row shielding signal MW1.

The column shielding signal MA1 provided by the column input circuit 44-1 may indicate whether the second input value Ax1 is "0" (the specified value) (referring to the related description of the column shielding signal MA1 shown in FIG. 5 for details). The row shielding signal MW1 provided by the row input circuit 43-1 may indicate whether the first input value W1x is "0" (the specified value) (referring to the related description of the row shielding signal MW1 shown in FIG. 5 for details). Based on the column shielding signal MA1 and the row shielding signal MW1, the computation shielding circuit 320' shown in FIG. 8 may generate a computation shielding signal M11. According to an actual design, the computation shielding circuit 320' may include AND gates or other logic gates. When the row shielding signal MW1 indicates that the first input value W1x is "0" and/or the column shielding signal MA1 indicates that the second input value Ax1 is "0", the computation shielding signal M11 may be a first logic level (for example, a low Level). When the row shielding signal MW1 indicates that the first input value W1x is not "0" and the column shielding signal MA1 indicates that the second input value Ax1 is not "0", the computation shielding signal M11 may be a second logic level (for example, a high level). Therefore, when the first input value W1x and the second input value Ax1 are both non-zero, the multiplication accumulation operation circuit 41 may be enabled to perform a multiplication accumulation operation. When at least one of the first input value W1x and the second input value Ax1 is zero, the multiplication accumulation operation circuit 41 may be disabled to suspend the multiplication accumulation operation.

In summary, each of the MAC cells of the matrix multiplier of the invention may be independently disabled (or enabled). Depending on whether the first input value is a specified value (for example, 0 or other real numbers), the MAC cells of the entire corresponding row may be selectively disabled to suspend the multiplication accumulation operations. Depending on whether the second input value is the specified value, the MAC cells of the entire corresponding column may be selectively disabled to suspend the multiplication accumulation operations. Therefore, the power consumption of the matrix multiplier may be effectively reduced.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A matrix multiplier, comprising:
   a plurality of first input lines;
   a plurality of second input lines; and
   a computing array, comprising a plurality of multiplication accumulation cells arranged in rows and columns, each first input line being coupled to the multiplication accumulation cells on the same row, each second input line being coupled to the multiplication accumulation cells on the same column,
   wherein a first input value is provided to the multiplication accumulation cells through a first corresponding input line of the plurality of first input lines, a second input value is provided to the multiplication accumulation cells through a second corresponding input line of the plurality of second input lines, and a first multiplication accumulation cell of the plurality of multiplication accumulation cells is coupled to receive the first input value and the second input value, and when at least one of the first input value and the second input value is a specified value, the multiplication accumulation operation of the first multiplication accumulation cell is disabled.

2. The matrix multiplier as claimed in claim 1, wherein the first multiplication accumulation cell comprises:
   a multiplication accumulation operation circuit, coupled to the first corresponding input line and the second corresponding input line to receive the first input value and the second input value to perform the multiplication accumulation operation; and
   a control circuit, controlling the multiplication accumulation operation circuit, wherein when at least one of the first input value and the second input value is the specified value, the control circuit disables the multiplication accumulation operation of the multiplication accumulation operation circuit.

3. The matrix multiplier as claimed in claim 2, wherein the multiplication accumulation operation circuit comprises:
   a first register, having an input terminal coupled to the first corresponding input line to receive the first input value, wherein the first register latches the first input value according to a first clock signal;
   a second register, having an input terminal coupled to the second corresponding input line to receive the second input value, wherein the second register latches the second input value according to a second clock signal; and
   a multiplication accumulation circuit, coupled to an output terminal of the first register and an output terminal of the second register, and performing the multiplication accumulation operation on an output of the first register and an output of the second register according to a third clock signal,
   wherein when at least one of the first input value and the second input value is the specified value, the control circuit shields the first clock signal, the second clock signal, and the third clock signal to disable the multiplication accumulation operation of the multiplication accumulation circuit.

4. The matrix multiplier as claimed in claim 3, wherein the control circuit comprises:
   a computation shielding circuit, receiving a column shielding signal and a row shielding signal, and generating a computation shielding signal, wherein the row shielding signal indicates whether the first input value is the specified value, and the column shielding signal indicates whether the second input value is the specified value; and
   a gate control circuit, coupled to an output terminal of the computation shielding circuit to receive the computation shielding signal, and coupled to a trigger terminal of the first register and a trigger terminal of the second register to control the multiplication accumulation operation, wherein the gate control circuit determines whether to provide the first clock signal and the second clock signal to the trigger terminal of the first register and the trigger terminal of the second register according to the computation shielding signal.

5. The matrix multiplier as claimed in claim 3, wherein the multiplication accumulation circuit comprises:
   a third register, storing a product accumulation value; and
   a multiplier-accumulator, coupled to the first register, the second register and the third register, wherein the multiplier-accumulator calculates a product of the output of the first register and the output of the second register, the multiplier-accumulator calculates a sum of the product and the product accumulation value, and the multiplier-accumulator provides the sum to the third register to update the product accumulation value.

6. The matrix multiplier as claimed in claim 5, wherein the third register updates the product accumulation value according to the third clock signal, and the control circuit comprises:
   a computation shielding circuit, receiving a column shielding signal and a row shielding signal, and generating a computation shielding signal, wherein the row shielding signal indicates whether the first input value is the specified value, and the column shielding signal indicates whether the second input value is the specified value;
   a fourth register, having an input terminal coupled to an output terminal of the computation shielding circuit to receive the computation shielding signal; and
   a gate control circuit, coupled to the fourth register and the third register, wherein the gate control circuit determines whether to provide the third clock signal to a trigger terminal of the third register according to an output of the fourth register.

7. The matrix multiplier as claimed in claim 1, further comprising:
   a plurality of row input circuits, wherein a first row input circuit of the row input circuits receives the first input value, and the first row input circuit determines whether the first input value is the specified value to generate a row shielding signal, and the first row input circuit provides the row shielding signal to the multiplication accumulation cells connected to the first corresponding input line; and
   a plurality of column input circuits, wherein a first column input circuit of the column input circuits receives the second input value, and the first column input circuit determines whether the second input value is the specified value to generate a column shielding signal, and the first column input circuit provides the column shielding signal to the multiplication accumulation cells connected to the second corresponding input line.

8. The matrix multiplier as claimed in claim 7, wherein the first row input circuit comprises:
   a determination circuit, determining whether the first input value is the specified value to generate the row shielding signal;
   a gate control circuit, determining whether to provide a clock signal according to the row shielding signal; and
   an input value register, latching and providing the first input value to the first corresponding input line according to the clock signal provided by the gate control circuit.

9. The matrix multiplier as claimed in claim 7, wherein the first column input circuit comprises:
   a determination circuit, determining whether the second input value is the specified value to generate the column shielding signal;
   a gate control circuit, determining whether to provide a clock signal according to the column shielding signal; and
   an input value register, latching and providing the second input value to the second corresponding input line according to the clock signal provided by the gate control circuit.

10. The matrix multiplier as claimed in claim 1, wherein the specified value is zero.

11. An operation method of a matrix multiplier, comprising:
    providing a first input value to a plurality of multiplication accumulation cells coupled to a first corresponding input line of a plurality of first input lines in a computing array;
    providing a second input value to a plurality of multiplication accumulation cells coupled to a second corresponding input line of the plurality of first input lines in the computing array;
    respectively receiving, by a first multiplication accumulation cell of the plurality of multiplication accumulation cells, the first input value and the second input value from a first corresponding input line of the plurality of first input lines and a second corresponding input line of the plurality of second input lines to perform a multiplication accumulation operation; and
    when at least one of the first input value and the second input value is a specified value, disabling the multiplication accumulation operation of the first multiplication accumulation cell.

12. The operation method as claimed in claim 11, wherein the first multiplication accumulation cell comprises a multiplication accumulation operation circuit and a control circuit, and the operation method further comprises:
    receiving the first input value and the second input value from the first corresponding input line and the second corresponding input line by the multiplication accumulation operation circuit to perform the multiplication accumulation operation; and
    controlling the multiplication accumulation operation circuit by the control circuit, wherein when at least one of the first input value and the second input value is the specified value, the control circuit disables the multiplication accumulation operation.

13. The operation method as claimed in claim 12, wherein the multiplication accumulation operation circuit comprises a first register, a second register and a multiplication accumulation circuit, and the operation method further comprises:
    receiving the first input value from the first corresponding input line by an input terminal of the first register;
    latching the first input value by the first register according to a first clock signal;
    receiving the second input value from the second corresponding input line by an input terminal of the second register; and
    latching the second input value by the second register according to a second clock signal;
    performing the multiplication accumulation operation on an output of the first register and an output of the second register by the multiplication accumulation circuit according to a third clock signal; and when at least one of the first input value and the second input value is the specified value, shielding the first clock signal, the second clock signal, and the third clock signal by the control circuit to disable the multiplication accumulation operation of the multiplication accumulation circuit.

14. The operation method as claimed in claim 13, wherein the control circuit comprises a computation shielding circuit and a gate control circuit, and the operation method further comprises:
generating a computation shielding signal by the computation shielding circuit according to a column shielding signal and a row shielding signal, wherein the row shielding signal indicates whether the first input value is the specified value, and the column shielding signal indicates whether the second input value is the specified value; and
determining, by the gate control circuit, whether to provide the first clock signal and the second clock signal to a trigger terminal of the first register and a trigger terminal of the second register according to the computation shielding signal.

15. The operation method as claimed in claim 13, wherein the multiplication accumulation circuit comprises a third register and a multiplier-accumulator, and the operation method further comprises:
storing a product accumulation value by the third register; and
calculating a product of the output of the first register and the output of the second register by the multiplier-accumulator;
calculating a sum of the product and the product accumulation value by the multiplier-accumulator; and
providing the sum to the third register by the multiplier-accumulator to update the product accumulation value.

16. The operation method as claimed in claim 15, wherein the third register updates the product accumulation value according to the third clock signal, the control circuit comprises a computation shielding circuit, a fourth register and a gate control circuit, and the operation method further comprises:
generating a computation shielding signal by the computation shielding circuit according to a column shielding signal and a row shielding signal, wherein the row shielding signal indicates whether the first input value is the specified value, and the column shielding signal indicates whether the second input value is the specified value;
receiving the computation shielding signal by an input terminal of the fourth register; and
determining, by the gate control circuit, whether to provide the third clock signal to a trigger terminal of the third register according to an output of the fourth register.

17. The operation method as claimed in claim 11, wherein the matrix multiplier further comprises a plurality of row input circuits and a plurality of column input circuits, and the operation method further comprises:
receiving the first input value by a first row input circuit of the row input circuits;
determining, by the first row input circuit, whether the first input value is the specified value to generate a row shielding signal;
providing, by the first row input circuit, the row shielding signal to the multiplication accumulation cells connected to the first corresponding input line;
receiving the second input value by a first column input circuit of the column input circuits;
determining, by the first column input circuit, whether the second input value is the specified value to generate a column shielding signal; and
providing, by the first column input circuit, the column shielding signal to the multiplication accumulation cells connected to the second corresponding input line.

18. The operation method as claimed in claim 17, wherein the first row input circuit comprises a determination circuit, a gate control circuit and an input value register, and the operation method further comprises:
determining, by the determination circuit, whether the first input value is the specified value to generate the row shielding signal;
determining, by the gate control circuit, whether to provide a clock signal according to the row shielding signal; and
latching and providing the first input value to the first corresponding input line by the input value register according to the clock signal provided by the gate control circuit.

19. The operation method as claimed in claim 17, wherein the first column input circuit comprises a determination circuit, a gate control circuit and an input value register, and the operation method further comprises:
determining, by the determination circuit, whether the second input value is the specified value to generate the column shielding signal;
determining, by the gate control circuit, whether to provide a clock signal according to the column shielding signal; and
latching and providing the second input value to the second corresponding input line by the input value register according to the clock signal provided by the gate control circuit.

20. The operation method as claimed in claim 11, wherein the specified value is zero.

* * * * *